UNITED STATES PATENT OFFICE.

MORGAN T. HOCHSTRASSER, OF GAINESVILLE, FLORIDA.

PROCESS OF MIXING CEMENT MORTAR.

1,225,129.

Specification of Letters Patent.   Patented May 8, 1917.

No Drawing.   Application filed July 25, 1916.   Serial No. 111,158.

*To all whom it may concern:*

Be it known that I, MORGAN T. HOCHSTRASSER, a citizen of the United States of America, residing at Gainesville, in the county of Alachua and State of Florida, have invented a new and useful Improvement in Processes of Mixing Cement Mortar, of which the following is a specification.

My present invention relates to an improved process of mixing cement mortar and concrete, and the object of my invention is to improve the efficiency of the mortar by securing a more thorough mixture of cement or cement and sand with the water or solvent in order to develop the mixture into a perfect jelly or condition resembling glue. By this process I decrease the time required in the ultimate mixture of the mortar with the coarser ingredients of the concrete, and I also attain a uniformity in the percentage of water absorbed in the mixture.

It is well known in this art that cement in a colloidal state or in condition resembling jelly or glue, is practically impervious to water, so that by highly developing and perfecting the colloidal condition of the mortar according to my invention, I secure a substantially waterproof material, which is also not affected by acids or alkali.

Therefore the prime feature of my invention or process is to change the cement from a crystalloid state by feeding its particles in a freely falling condition and predetermined or regulated quantities to the solvent or water in order to provide the proper mixture.

Preferably the colloidal state of the mixture is attained by using a quantity of water, known to be in excess of the quantity required, for dissolving the cement or cement and sand, in such manner that the molecules of the cement separate and dissolve into ions, and in this condition of dissociation the cement is especially prepared for colloidal formation.

In carrying out the process of my invention, I utilize a hopper in which a screen or sieve, either of the rotary, reciprocating, or agitating type is operative. Into this hopper the cement is fed, or it may be that a mixture of both cement and sand are fed to the hopper after having been previously mixed in a dry mixer. The cement or mixture of cement and sand, as the case may be, is passed through the sieve or reticulated member in the hopper and "dusted" or sifted into a receptacle located just below the sieve, and filled to the required depth with an excess quantity of water. After being properly treated in the water receptacle or tank, the colloidal mass of mortar is passed to the usual concrete mixer, and the coarser components or ingredients are added and the entire mass commingled to provide the concrete material.

As the cement, or mixture of cement and sand, is sifted through the sieve and falls into the water it will be evident that the crystalloid is readily and quickly and uniformly diffused and subjected to the water as a solvent. The feeding of the minute particles of cement, or mixture of cement and sand, into the water in such large numbers increases the aggregate area of surface subjected or exposed to the water and therefore the action is more effective than if the cement in a lump or clot were fed to the water in the tank. And it will be further evident that by increasing this aggregate surface and decreasing the size of the diffusing portions or cement particles, I render the operation of diffusion more complete.

The step of sifting the cement, or mixture of sand and cement, into the water in the tank also enables me to subject the cement to the dissolving action of the solvent, water, in such a manner that as the molecules of the cement dissolve they dissociate into ions, and as a result of the chemical and physical re-actions of the dissociation products, the colloidal or jelly formation is secured.

Because of the extraordinarily large area or surface in colloids, the re-actions will occur more rapidly, as the amount of chemical change in the unit of time is proportional to the absolute surface. I am thus enabled to place the cement in such a condition as will permit the reversible re-action to take place under the most favorable conditions.

While transferring the cement or mixture of cement and sand from the dry mass or crystalloid state to the colloidal or gelatinous state I am enabled to control the percentage of water absorbed, as the hydrolytic decomposition can be forced back by the addition of the un-dissociated product of hydrolysis.

After the material has been formed into a coagulated or gelatinous mass in the tank, the excess water quickly rises in a clear state above the colloid and this liquid may then be drawn off with facility without loss of cement.

After the excess water has been drained off, the colloidal mass or jelly in the tank or vessel is conveyed or fed to the mixer, and the coarser ingredients are there incorporated in the mass to produce the commercial concrete.

What I claim is:—

The process of mixing cement mortar and concrete which consists in sifting finely comminuted cement into an excess of water, to form a colloidal mass, draining off the excess water, and finally mixing the colloidal mass with the coarser ingredients of the concrete.

In testimony whereof I affix my signature.

MORGAN T. HOCHSTRASSER.

Copies of this patent may be obtained for five cents each, by addressing the "Commissioner of Patents, Washington, D. C."